United States Patent Office 3,446,730
Patented May 27, 1969

3,446,730
CATALYTIC HYDRODENITROGENATION OF PETROLEUM FRACTIONS
Bernard A. Kerns, Pittsburgh, and Olaf A. Larson, Oakmont, Pa., assignors to Gulf Research & Development Company, Pittsburgh, Pa., a corporation of Delaware
No Drawing. Filed June 21, 1966, Ser. No. 559,116
Int. Cl. C10g 23/02
U.S. Cl. 208—254      4 Claims

ABSTRACT OF THE DISCLOSURE

Improved denitrogenation of nitrogen-containing hydrocarbon oil feeds is obtained by the use of a hydrodenitrogenation catalyst consisting essentially of at least one component selected from the group consisting of nickel and a metal selected from the left-hand column of Group VI of the Periodic Table, and oxides and sulfides thereof, said component being composited with a special activated alumina, said catalyst being promoted with a small amount of phosphorus, silicon and/or barium.

---

This invention relates to the hydrodenitrogenation of a hydrocarbon which contains nitrogenous impurities. It particularly relates to catalytic hydrodenitrogenation processes in which the catalyst employed includes a particular alumina derived from an intermediate alumina hydrate.

Nitrogenous compounds exert harmful effects in petroleum fractions. In hydrocracking feed, for instance, they cause a rapid loss of activity in the hydrocracking catalyst. Similar harmful effects are observed in catalytic cracking and reforming processes. It is known that these nitrogenous impurities can be removed by processes comprising treatment with hydrogen in the presence of hydrogenation catalysts at elevated temperatures and pressures. These processes result in a marked enhancement of the properties of the treated hydrocarbons. However, these processes are not without difficulties. In many cases expensive operating conditions are required. It has also at times been necessary to replace the hydrogenation catalyst regularly as metal impurities in the feeds deleteriously affected its activity. In the hydrotreating of residual types of mineral oils the deposition of carbonaceous material on the catalyst surface exerts a strong deactivating effect. In all these cases a highly active catalyst is desirable.

The hydrodenitrogenation catalysts referred to above customarily have been composited with conventional types of alumina supports. In has been found that the substitution of a particular alumina, derived from an intermediate alumina hydrate containing from 1.2 to 2.6 mols of water of hydration, for the conventional aluminas of previously known hydrotreating catalysts increases greatly the denitrogenative effect of the hydrodenitrogenation treatment. U.S. Patent Nos. 3,151,939, 3,151,940 and 3,188,174 describe in detail the preparation of the particular alumina. This alumina may be described, in brief, as an activated alumina prepared by calcining a substance which is predominantly composed of an aluminum hydroxide containing from 1.2 to 2.6 mols of water of hydration, said aluminum hydroxide being prepared by precipitation from a solution of an aluminum compound under prescribed pH conditions between 7 and 12, and drying to the above-indicated water of hydration prior to substantial transformation to an aluminum hydroxide having a higher or lower water of hydration content. The use of these special activated aluminas in catalysts employed in hydrotreating permits hydrodenitrogenation and other reactions at much lower pressures than formerly because of the relatively greater activity of such catalysts. Pressures as low as 200 p.s.i.g. may be adequate with such catalysts.

It has also been known to increase the activity of hydrotreating catalysts and to decrease the deposition of carbonaceous matter in hydrofining processes by the use of promoters. British Patent Nos. 701, 217 and 719,640, for instance, disclose a hydrodesulfurizing catalyst comprising cobalt and molybdenum oxides on a metal oxide carrier promoted with phosphorous or fluorine or both. It has, however, not been known to promote composite catalysts containing chiefly aluminas derived from the intermediate alumina hydrates disclosed herein.

It is an object of this invention to provide a method for the denitrogenation of hydrocarbon fractions containing nitrogen impurities.

It is an object of this invention to provide a method of promotion of hydrogenation catalysts used in denitrogenation processes.

It is a further object of this invention to provide an improved catalyst for use in denitrogenation processes.

It is a still further object to provide a method for the promotion of a denitrogenation catalyst supported on the particular alumina referred to above.

Other objects will appear hereinafter.

These and other objects of our invention are accomplished by the subjecting nitrogen-containing petroleum stocks boiling above about 100° F. to contact with hydrogen in the presence of certain composite catalysts containing at least one hydrodenitrogenation component selected from the group consisting of nickel and metals of the Group VI of the Periodic Table and oxides and sulfides thereof, and composited with an activated alumina prepared by calcining an aluminum hydroxide containing from 1.2 to 2.6 mols of water of hydration, said aluminum hydroxide being prepared by precipitation from a solution of an aluminum compound at a pH between 7 and 12 and drying to the above-indicated water of hydration prior to transformation to an aluminum hydroxide having a higher or lower water of hydration content, said catalyst being promoted with 0.1 to 2.0 percent by weight of a compound selected from the group consisting of phosphorous, silicon and barium, and withdrawing a treated petroleum stock which has substantially lower nitrogen content that the feed.

Our invention is applicable to the treatment of any hydrocarbon derived from petroleum which boils above 100° F. and which contains a higher amount of nitrogenous impurities than required for the purpose for which the hydrocarbon is to be employed. Thus, our invention is applicable to the treatment of straight-run petroleum fractions such as gasoline, gas oil or a residual stock such as a topped or reduced crude. It is furthermore applicable to the whole crudes. Our inveniton is also applicable to hydrocarbons derived from petroleum such as those produced in cracking processes such as thermal or catalytic cracking.

Thus, our invention is applicable to the treatment of nitrogenous catalytic and straight run gasoline, catalytic cycle oil, catalytic and straight run furnace oil, gas oil, etc. Our invention is also applicable to similar hydrocarbons derived from coal and shale. In order to obtain the improved denitrogenation disclosed herein, the feed stock should contain nitrogen in an amount greater than 5 parts per million parts of oil.

Our process can be operated at a temperature of 500° to 800° F., although a temperature of 600° to 700° F. is preferred. A pressure of 200 to 5000 p.s.i. may be used, although it is desirable to maintain as low a pressure as possible. The space velocity should be from 0.5 to 10 with a preferred range of from 1 to 6. Hydrogen may vary from 500 to 20,000 cubic feet per barrel of charge. It is preferred that 1500 to 10,000 cubic feet per barrel of charge be used. Hydrogen can be provided in its pure form or alternatively as a part of a gas mixture of which the hydrogen comprises at least 50 percent. In general, it is preferred that the hydrogen content of the mixture is at least 70 percent.

The composite catalysts used in our invention include the usual denitrogenation, i.e., hydrogenation metals of the left-hand column of Group VI of the Periodic Table, and oxides and sulfides thereof, either alone or in combination with nickel, either as such or in oxided or sulfided form, composited with the previously described special, activated aluminas. The nature of the hydrogenation component of the composite catalysts disclosed herein is very important, as we have found that not every hydrogenation component, when composited with the herein disclosed aluminas, is susceptible to promotion as disclosed herein. For example, cobalt-containing catalysts prepared from the special aluminas disclosed herein are unsuitable for purposes of this invention, notwithstanding that cobalt is often a component of conventional denitrogenation catalysts. In fact, our experiments indicate that the denitrogenative activity of catalysts comprising cobalt and the special activated aluminas disclosed herein are actually lessened by the addition thereto of phosphorous, silicon or barium. Furthermore, composite catalysts prepared from the herein disclosed aluminas and platinum group metals are capparently unaffected b ythe promoters of this invention. The preparation of the special activated aluminas disclosed herein is fully described in U.S. Patent Nos. 3,151,939, 3,151,940 and 3,188,174. As previously indicated such aluminas are prepared by calcining a substance which is predominately composed of an aluminum hydroxide containing 1.2 to 2.6 mols of water of hydration, which has been precipitated from a solution of an aluminum compound under prescribed pH conditions between 7 and 12, and drying to the above-indicated water of hydration content prior to transformation to an aluminum hydroxide of higher or lower water of hydration content.

The composite catalysts of the invention are promoted by an addition of from 0.1 to 2.0 percent by weight of a promoter selected from the group consisting of phosphorous, silicon and barium. The promoter may be applied either during the makeup of the denitrogenation catalysts or after they have been placed on stream. In the latter event, the promoter is injected into the petroleum feed stock and carried thereby to the catalysts.

Any compound, for instance, which contains the desired promoter and which is miscible with the feed could be so injected. Suitable phosphorous compounds include those broadly designated as the organophosphorous compounds. These comprehend the phosphines, such as alkyl phosphine, dialkyl phosphine, trialkyl phosphine, and phosphine itself; the phosphites such as alkyl phosphites and their derivatives and the phosphates and their derivatives.

The process of our invention will become more clear on consideration of the following examples. It is understood that these examples are given by way of illustration and not in limitation of our invention.

A series of hydrodenitrogenation runs were made at the same operating conditions on the same charge and with composite catalysts formed from various hydrogenating metals and the special, activated alumina disclosed herein. The hydrogenating components consisted of nickel-cobalt-molybdenum, nickel-molybdenum and nickel-tungsten initially in oxide form. The last two catalysts are examples of catalysts whose use is included by the present invention. A run was made with each catalyst unpromoted and promoted with 0.5% phosphorous, barium or silicon.

The activated alumina support for each catalyst was prepared by dissolving 4370 grams $AlCl_3 \cdot 6H_2O$ in 20 liters of water and adding 500 grams of glacial acetic acid to form a first solution. A second solution was prepared by mixing 4 liters of concentrated $NH_4OH$ with 10 liters of water. These solutions were mixed with rapid agitation. The pH of the resultant slurry was 8.0. Fifteen and one-half liters of the aqueous ammonia solution were employed. The precipitate which resulted was separated by filtration, and the cake was washed with water containing 10 grams of ammonium acetate per liter and dried at 250° F. The time elapsing between addition of ammonia and completion of drying was 139 hours. This dried material was broken and sieved to recover the 10–20 mesh class. It contained approximately 1.7 mols of water of hydration. It was brought to a temperature of 1000° F. over a period of six hours and calcined for 11 hours at that temperature.

The nickel-cobalt-molybdenum catalyst was prepared in the following manner. The molybdenum was deposited on the base from an ammonium paramolybdate solution by the incipient wetness method in which just enough liquid to wet completely the solid support is applied. The material was oven-dried at 250° F. Then the cobalt and nickel were added by the incipient wetness technique from aqueous solutions of their metal nitrates. The catalyst was oven-dried overnight at 250° F. It was then gradually heated in air to 1000° F. in 6 hours and calcined at that temperature for 10 hours to decompose the salts and to form the corresponding oxides.

The nickel-molybdenum catalyst was prepared similarly. No solution of cobalt nitrate was necessary of course. The nickel-tungsten catalyst was prepared by depositing tungsten on the above-described activated alumina from an ammonium metatungstate in water solution and simultaneously depositing nickel from a nickel nitrate solution. The incipient wetness method was used. This catalyst was oven-dried and calcined in the same manner as the others.

The addition of the given promoter to the above-mentioned catalysts was made by methods found by past experience to give the maximum effect for the particular promoter. Barium was incorporated by the addition of the desired quantity of a barium nitrate in water solution to the calcined alumina support prior to addition of metals using the incipient wetness technique. Phosphorous was incorporated by the addition of ammonium phosphate in the desired amount during the impregnation of the alumina base with ammonium paramolybdate or ammonium metatungstate. Silicon was incorporated by impregnating the finished catalysts with a predetermined amount of ethylorthosilicate. The wet material was dried at about 250° F. for 24 hours and calcined by heating in an electric muffle to 1000° F. in 6 hours and holding it at this temperature for about 10 hours to decompose the material into silica.

The operating conditions for each of the runs were 650° F., 1000 p.s.i., 3.0 LSHV and 4000 standard cubic feet of hydrogen per barrel of charge stock. The feed was a furnace oil distillate with a nitrogen content of 340 p.p.m. and a sulfur content of 2.03% by weight. The detailed inspections of the feed are given in Table II. The results of the runs can be seen in Table I. The unpromoted nickel-cobalt-molybdenum catalyst lowered the nitrogen content from 340 p.p.m. to 9 p.p.m. The nickel-molybdenum catalyst lowered the nitrogen content to 14 p.p.m. and the unpromoted nickel-tungsten catalyst lowered it to 15 p.p.m. Thus, nickel-molybdenum and nickel-tungsten are inferior to nickel-cobalt-molybdenum as unpromoted catalysts. When the 0.5% phosphorous was added to the catalyst the nitrogen content was increased to 14 p.p.m. for nickel-cobalt-molybdenum, and decreased to 2.8 p.p.m. for nickel-molybdenum and 13 p.p.m. for the nickel tungsten. Thus, a substantial improvement was effected by the promotion except in the run in which cobalt-containing catalyst was used. The nickel-cobalt-molybdenum catalyst decreased in denitrogenation activity when promotion was attempted with phosphorous. Similarly, the addition of 0.5% barium or 0.5% silicon resulted in an increased denitrogenative effect for nickel-molybdenum and nickel-tungsten catalysts and decreased denitrogenative effect for the nickel-cobalt-molybdenum catalysts.

Other runs were made to illustrate the promotion with phosphorous of conventional cobalt-containing catalysts. The feed stock was a furnace oil distillate with a nitrogen content of 340 p.p.m. and sulfur content of 2.03% by weight. The catalysts were nickel-cobalt-molybdenum catalysts deposited on conventional alumina supports (Filtrol 86).

Runs were made at two sets of reaction conditions with the catalysts unpromoted and promoted with 0.3% phosphorous. The first two runs were at a pressure of 600 pounds per square inch, a temperature of 650° F., and a liquid hourly space velocity of 4. The second two runs were at a pressure of 1000 pounds per square inch, a temperature of 650° F., and a liquid hourly space velocity of 3. The results are shown in Table III. At each set of reaction conditions denitrogenation was substantially improved by phosphorous promotion.

TABLE I

| Catalyst: | Product inspections nitrogen, p.p.m. |
|---|---|
| I | |
| 11% Mo, 1.25% Co, 2.3% Ni on special activated alumina | 9 |
| Plus 0.5 barium | 13 |
| Plus 0.5 phosphorous | 14 |
| Plus 0.5 silicon | 17 |
| II | |
| 6% Ni, 10% Mo on special activated alumina | 14 |
| Plus 0.5 barium | 2.8 |
| Plus 0.5 phosphorous | 2.8 |
| Plus 0.5 silicon | 7 |
| III | |
| 6% Ni=19% W on special activated alumina | 15 |
| Plus 0.5 barium | 5.8 |
| Plus 0.5 phosphorous | 13 |
| Plus 0.5 silicon | 14 |

TABLE II

| Inspections of FCC furnace oil: | |
|---|---|
| Gravity, ° API | 20.8 |
| ASTM distillation (D 158)— | |
| Initial boiling point, ° F | 446 |
| 10%, ° F. | 506 |
| 50% | 548 |
| 90% | 610 |
| Endpoint, ° F. | 636 |
| Recovery, volume percent | 98.3 |
| Nitrogen, p.p.m. | 340 |
| Sulfur, percent by wt | 2.03 |

TABLE III.—EFFECT OF PHOSPHORUS PROMOTER ON CONVENTIONAL COBALT CONTAINING CATALYST

[Reaction conditions: 600 p.s.i.g., 650° F., 4 LHSV]

| | Percent S removal | Percent N removal |
|---|---|---|
| (A) 10% Mo-1.8% Co-0.3% Ni +0.3% P, Filtrol 86 $Al_2O_3$ | 93.1 | 53.0 |
| (B) 10% Mo-1.8% Co-0.3% Ni, Filtrol 86 $Al_2O_3$ | 89.6 | 38.8 |

[Reaction conditions: 1,000 p.s.i.g., 650° F., 3 LHSV]

| | Percent S removal | Percent N removal |
|---|---|---|
| (A) 10% Mo-1.8% Co-0.3% Ni +0.3% P, Filtrol 86 $Al_2O_3$ | 97.7 | 94.7 |
| (B) 10% Mo-1.8% Co-0.3% Ni, Filtrol 86 $Al_2O_3$ | 94.1 | 69.1 |

We claim:
1. A process for the denitrogenation of nitrogen-containing petroleum stocks boiling above about 100° F. which comprises:
   (a) contacting said stock with hydrogen and a composite catalyst consisting essentially of:
      (1) a member selected from the group consisting of nickel, a metal selected from the left-hand column of Group VI of the Periodic Table, the oxides and sulfides of said metals, and mixtures thereof, and
      an alumina composited with said member (1) said alumina being formed by calcining aluminum hydroxide containing 1.2 to 2.6 mols of water of hydration, said aluminum hydroxide being prepared by forming a precipitate from a solution at a pH of 7 to 12 and drying said precipitate to the above indicated water of hydration;
      (2) a catalyst promotor selected from the group consisting of phosphorous, silicon, and barium in an amount from 0.1% to 2.0% by weight of said composite catalyst;
   (b) said contacting being carried out at a temperature of 500°-800° F., a pressure of 200-5000 p.s.i., a space velocity of 0.5-10 volumes per hour per volume, at a hydrogen feed rate of 500-20,000 standard cubic feet per barrel; and
   (c) withdrawing a treated petroleum stock which contains a substantially lower nitrogen content than the feed stock.

2. The process as set forth in claim 1 in which the catalyst contains about 0.5% promoter.

3. The process of claim 1, wherein the metal selected from the left-hand column of Group VI of the Periodic Table is molybdenum.

4. The process as set forth in claim 1 in which the temperature is 600°-700° F., the space velocity is 1-6 volumes per hour per volume, and the hydrogen feed rate is 1500-10,000 standard cubic feet per barrel of feed.

References Cited

UNITED STATES PATENTS

| 3,116,233 | 12/1963 | Douwes et al. | 208—217 |
| 3,145,160 | 8/1964 | Jacobson | 208—216 |
| 3,125,510 | 3/1964 | Tupman et al. | |
| 3,188,174 | 6/1965 | Kehl et al. | |
| 3,222,273 | 12/1965 | Flinn et al. | |
| 3,277,199 | 10/1966 | Poll. | |

DELBERT E. GANTZ, *Primary Examiner.*

G. J. CRASANAKIS, *Assistant Examiner.*

U.S. Cl. X.R.

252—432, 435, 453